United States Patent
Huang et al.

(10) Patent No.: US 11,105,439 B2
(45) Date of Patent: Aug. 31, 2021

(54) PINCH VALVE WITH FAILURE PREDICTION MODULE

(71) Applicant: Bio-Chem Fluidics, Inc., Boonton, NJ (US)

(72) Inventors: Henry X Huang, Edison, NJ (US); Ethan Matthew Gardner, Hoboken, NJ (US); Razvan Bulugioiu, Mountain Lakes, NJ (US); Michael Swern, Boonton, NJ (US); William A Easterbrook, Clinton, NJ (US); Sharad Harihar Joshi, Sr., Morristown, NJ (US)

(73) Assignee: BIO-CHEM FLUIDICS, INC., Boonton, NJ (US)

( * ) Notice: Subject to any disclaimer, the term of this patent is extended or adjusted under 35 U.S.C. 154(b) by 224 days.

(21) Appl. No.: 16/527,748

(22) Filed: Jul. 31, 2019

(65) Prior Publication Data

US 2020/0041035 A1 Feb. 6, 2020

Related U.S. Application Data

(60) Provisional application No. 62/712,688, filed on Jul. 31, 2018.

(51) Int. Cl.
*F16K 37/00* (2006.01)
*G01D 5/14* (2006.01)
(Continued)

(52) U.S. Cl.
CPC .......... *F16K 37/0041* (2013.01); *F16K 7/045* (2013.01); *F16K 7/07* (2013.01);
(Continued)

(58) Field of Classification Search
CPC ........ F16K 37/0041; F16K 7/045; F16K 7/07; F16K 37/0083; F16K 37/0033; G01D 5/145
(Continued)

(56) References Cited

U.S. PATENT DOCUMENTS

| | | | |
|---|---|---|---|
| 4,061,142 A | * | 12/1977 | Tuttle ...................... A61M 1/30 604/34 |
| 4,377,392 A | | 3/1983 | Massey |

(Continued)

FOREIGN PATENT DOCUMENTS

| | | |
|---|---|---|
| DE | 19900320 C1 | 7/2000 |
| DE | 212015000096 U1 | 11/2016 |

(Continued)

OTHER PUBLICATIONS

Hojnik et al. "Contactless Position Sensing and Control of Pneumatic Cylinders using a Hall Effect Sensor Array" Cyber-physical Systems, Commonwealth Scientific and Industrial Research Organisation, Science and Engineering Faculty, Queensland University of Technology, 8 pgs.

(Continued)

*Primary Examiner* — John Bastianelli
(74) *Attorney, Agent, or Firm* — Dinsmore & Shohl LLP

(57) ABSTRACT

A pinch valve configuration may include a pinch valve comprising a valve body, a valve plunger, and a fluidic tubing pinch passage defined between a tubing seat of the valve body and an operative end of the valve plunger. The pinch valve configuration may further include a Hall effect sensor assembly comprising a stationary element anchored to the valve body and a motive element anchored to the valve plunger. The pinch valve configuration additionally includes a failure prediction module in communication with the Hall effect sensor assembly. The failure prediction (Continued)

module is programmed to process an output signal of the Hall effect sensor assembly as a displacement reading, to compare the displacement reading with a failure prediction threshold, and to generate a failure prediction signal from the comparison of the displacement reading with the failure prediction threshold.

15 Claims, 3 Drawing Sheets

(51) Int. Cl.
    *F16K 7/07*     (2006.01)
    *F16K 7/04*     (2006.01)

(52) U.S. Cl.
    CPC .......... *G01D 5/145* (2013.01); *F16K 37/0033* (2013.01); *F16K 37/0083* (2013.01)

(58) Field of Classification Search
    USPC .......................................... 251/4–10, 129.04
    See application file for complete search history.

(56) References Cited

U.S. PATENT DOCUMENTS

| | | | |
|---|---|---|---|
| 5,221,268 A * | 6/1993 | Barton | A61M 5/16813 251/7 |
| 5,244,002 A | 9/1993 | Frederick | |
| 5,445,613 A * | 8/1995 | Orth | A61M 39/281 251/14 |
| 6,012,342 A * | 1/2000 | Blight | A61M 39/281 137/595 |
| 6,152,172 A | 11/2000 | Christianson et al. | |
| 6,321,781 B1 | 11/2001 | Kurth | |
| 6,326,898 B1 | 12/2001 | O'Leyar et al. | |
| 6,917,203 B1 | 7/2005 | Perotti et al. | |
| 7,393,337 B2 | 7/2008 | Tonelli et al. | |
| 7,405,917 B2 | 7/2008 | Ahrens et al. | |
| 7,432,721 B2 | 10/2008 | Rober | |
| 7,628,378 B2 | 12/2009 | Adams et al. | |
| 8,055,460 B2 | 11/2011 | Rajagopalan et al. | |
| 8,271,141 B2 | 9/2012 | Cummings et al. | |
| 8,737,034 B2 | 5/2014 | Gietler et al. | |
| 9,316,478 B2 | 4/2016 | Wirkowski et al. | |
| 9,476,943 B2 | 10/2016 | Ho et al. | |
| 9,759,760 B2 | 9/2017 | Leif | |
| 2007/0170382 A1 | 7/2007 | Li et al. | |
| 2012/0018654 A1 | 1/2012 | Wennberg et al. | |
| 2012/0278006 A1 | 11/2012 | Weatherbee et al. | |
| 2016/0125993 A1 | 5/2016 | Narayanasamy et al. | |
| 2016/0291075 A1 | 10/2016 | Sommansson | |
| 2018/0292445 A1 | 10/2018 | Narayanasamy et al. | |

FOREIGN PATENT DOCUMENTS

| | | |
|---|---|---|
| JP | 2006287043 A | 10/2006 |
| WO | 2008086849 A1 | 7/2008 |
| WO | 2015155661 A1 | 10/2015 |
| WO | 2017194295 A1 | 11/2017 |

OTHER PUBLICATIONS

Keiser et al. "Sensing Methodologies in Pinch Valves" A Bimba Whitepaper, Acro Associates, 5 pgs.
Eyabi "Modeling and Sensorless Control of Solenoidal Actuators" The Ohio State University, 2003, 157 pgs.
International Search Report and Written Opinion pertaining to PCT/US2019/044395, dated Oct. 18, 2019.

* cited by examiner

PINCH VALVE WITH FAILURE PREDICTION MODULE

CROSS-REFERENCE TO RELATED APPLICATIONS

This application claims the benefit of U.S. Provisional Application Ser. No. 62/712,688 (BCF 0011 MA), filed Jul. 31, 2018.

BACKGROUND

The present disclosure relates to pinch valve configurations and, more particularly, to failure prediction in pinch valve configurations.

BRIEF SUMMARY

According to the subject matter of the present disclosure, Hall effect sensor assemblies are provided in the construction of pinch valve configurations to provide a means for predicting failure in the pinch valve configuration.

According to the subject matter of the present disclosure, a pinch valve configuration comprises a pinch valve comprising a valve body, a valve plunger, and a fluidic tubing pinch passage defined between a tubing seat of the valve body and an operative end of the valve plunger. The pinch valve configuration further comprises a Hall effect sensor assembly comprising a stationary element anchored to the valve body and a motive element anchored to the valve plunger. The pinch valve configuration also comprises a failure prediction module in communication with the Hall effect sensor assembly. The failure prediction module is programmed to process an output signal of the Hall effect sensor assembly as a displacement reading, to compare the displacement reading with a failure prediction threshold, and to generate a failure prediction signal from the comparison of the displacement reading with the failure prediction threshold.

In accordance with one embodiment of the present disclosure, a pinch valve configuration comprises a pinch valve comprising a valve body, a valve plunger, and a fluidic tubing pinch passage defined between a tubing seat of the valve body and an operative end of the valve plunger. The pinch valve configuration further comprises Hall effect sensor assembly comprising a stationary element anchored to the valve body and a motive element anchored to the valve plunger. The pinch valve configuration also comprises a failure prediction module in communication with the Hall effect sensor assembly. The failure prediction module is programmed to process an output signal of the Hall effect sensor assembly as a displacement reading, to compare the displacement reading with a failure prediction threshold, and to generate a failure prediction signal from the comparison of the displacement reading with the failure prediction threshold. The stationary element is a magnet and the motive element is the Hall effect sensor. The Hall effect sensor assembly produces an output signal based on the proximal relationship between the stationary element and the motive element. The displacement reading represents a degree to which the valve plunger extends into, or away from, the fluidic tubing pinch passage. The failure prediction threshold represents a degree of tubing compression exceeding a threshold tubing compression metric. The pinch valve configuration further comprises fluidic tubing extending through the fluidic tubing pinch passage of the pinch valve. The failure prediction threshold represents whether compression of the fluidic tubing extending through the fluidic tubing pinch passage exceeds a threshold tubing compression metric.

Although the concepts of the present disclosure are described herein with primary reference to one specific type of a pinch valve configuration, it is contemplated that the concepts will enjoy applicability to wide variety of pinch valve configurations.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
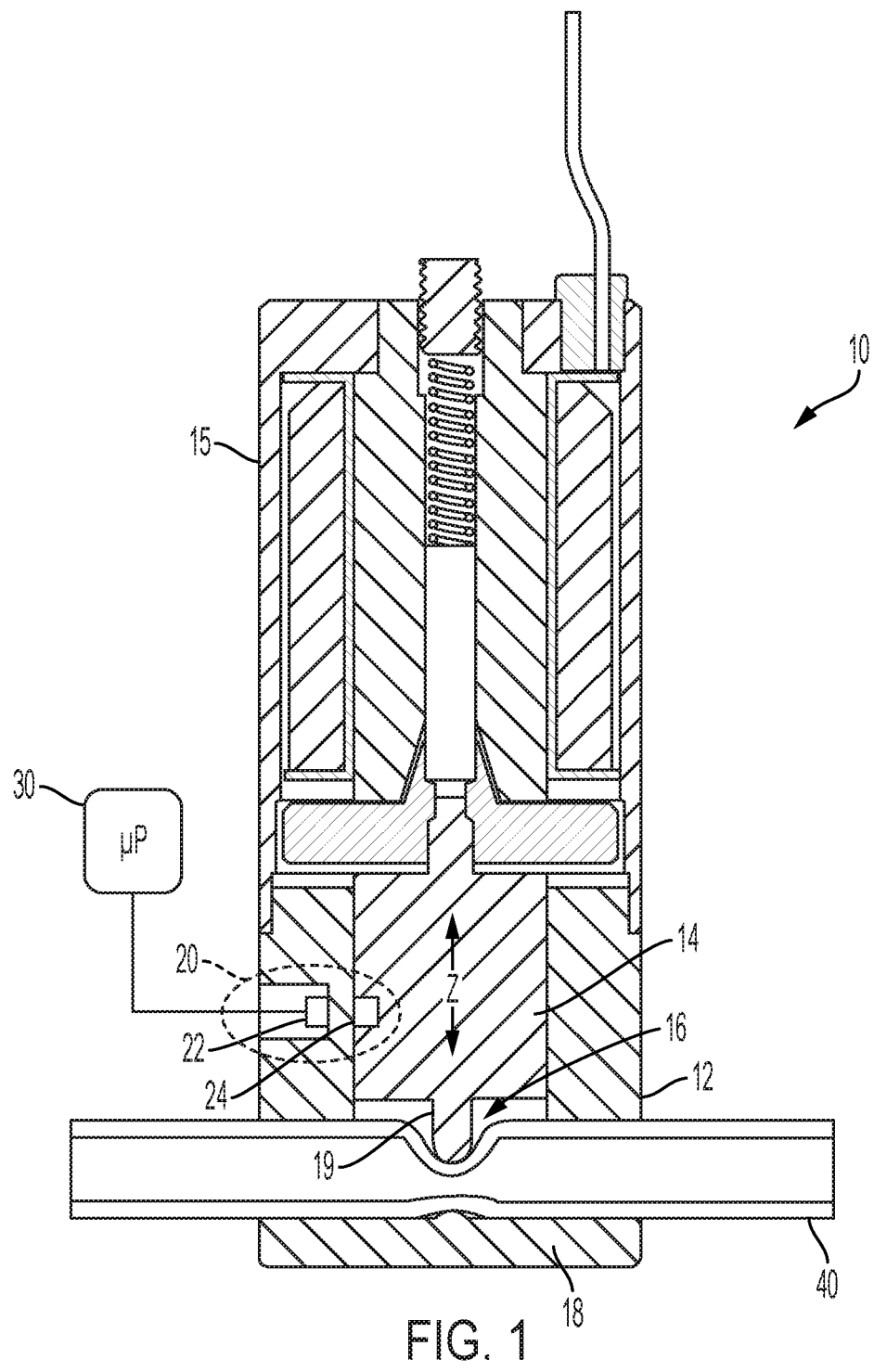
FIG. 1 is an illustration of a pinch valve configuration according to one embodiment of the present disclosure.

Referring initially to FIG. 1, a pinch valve configuration comprises a pinch valve 10, a Hall effect sensor assembly 20, and a failure prediction module 30. The pinch valve 10 comprises a valve body 12, a valve plunger 14, a solenoid assembly 15, and a fluidic tubing pinch passage 16 defined between a tubing seat 18 of the valve body 12 and an operative end 19 of the valve plunger 14. The pinch valve 10 may be tailored to complement a variety of tubing configurations and may embody a variety of conventional or yet-to-be developed normally-open or normally-closed pinch valve configurations including, but not limited to, the configuration illustrated in FIG. 1, which is a two-way pinch valve, and other configurations, like three-way pinch valves, four-way pinch valves, etc.

The Hall effect sensor assembly 20 comprises a stationary element 22 anchored to the valve body 12 and a motive element 24 anchored to the valve plunger 14. The failure prediction module 30 is in communication with the Hall effect sensor assembly 20. The failure prediction module 30 uses an output signal of the Hall effect sensor assembly 20 to generate a displacement reading that is indicative of the degree to which the tubing is compressed, and may do so using any suitable conventional, or yet-to-be developed, Hall effect sensor technology. The failure prediction module may be configured to compare the displacement reading with a failure prediction threshold, and to generate a failure prediction signal from the comparison of the displacement reading with the failure prediction threshold.

The failure prediction signal may comprise a positive indicator, a cautionary indicator, a negative indicator, or combinations thereof. For example, a visual representation of the degree of the failure prediction signal may manifest in the form of a display having, for example, a green indicator, a yellow indicator, and a red indicator, which indicate correspond to a positive indicator, a cautionary indicator, a negative indicator, respectively. The green indicator may signify that a comparison of the displacement reading with the failure prediction threshold indicates that failure of the pinch valve 10 is not imminent. The yellow indicator may signify that comparison of the displacement reading with the failure prediction threshold indicates that failure of the pinch valve 10 is imminent. Likewise, the red signal may signify that comparison of the displacement reading with the failure prediction threshold indicates that failure of the pinch valve 10 has occurred or is occurring. An auditory sensor with varying pitches that indicate failure of the pinch valve 10 may be used in addition to or instead of a visual representation. As such, in some embodiments, the failure prediction signal comprises multiple components that are collectively indicative of the failure prediction signal from the comparison of the displacement reading with the failure prediction threshold.

The output signal of the Hall effect sensor assembly 20 may be a voltage signal, or any other suitable signal capable of generating the failure prediction signal from the comparison of the displacement reading with the failure prediction threshold. In embodiments, the stationary element 22 is a magnet and the motive element 24 is the Hall effect sensor. In other embodiments, the stationary element 22 is the Hall effect sensor and the motive element is a magnet 24.

As used in this description, the term "Hall effect sensor" means a device that is used to measure the magnitude of a magnetic field. Typically, the output voltage produced by a Hall effect sensor corresponds to the strength of the magnetic field in which it is positioned. Hall effect sensors are often used for proximity sensing, positioning, speed detection, and current sensing applications. A Hall effect sensor may also be combined with threshold detection, such that the Hall effect sensor acts as a switch.

The Hall Effect sensor assembly 20 can be used to produce a digital or analog output signal that is indicative of the relative positioning of the stationary element 22 and the motive element 24, and how this relative positioning, which can be manifested as the displacement reading, changes over time. In this manner, the displacement reading can be compared to the failure prediction threshold to generate a failure prediction signal. In the illustrated embodiment, the stationary element 22 and the motive element 24 are maximally aligned when the tubing is partially pinched, but still open. However, it is noted that these two elements may assume any of a wide variety of positional relationships, in any of a variety of valve states. For example, and not by way of limitation, it is contemplated that the stationary element 22 could be positioned at a "failure" position such that a failure signal could be generated when the motive element 24 gets too close to the failure position. Alternatively, the stationary element could be positioned at a "home" position, in alignment with the motive element 24, when the valve is in an open state, such that a failure signal could be generated when the motive element 24 gets too far away from the home position.

The failure prediction threshold may represent a degree of tubing compression exceeding a threshold tubing compression metric for various tubing materials. Suitable examples of tubing materials may include, but are not limited to, cured silicone tubing and thermoplastic elastomer tubing.

Regardless of the tubing materials selected, the failure prediction threshold may represent a degree to which tubing compression increases over time with a given length of tubing seated in the fluidic tubing pinch passage 16 of the pinch valve 10.

As shown in FIG. 1, the pinch valve configuration may further comprise fluidic tubing 40 extending through the fluidic tubing pinch passage 16 of the pinch valve 10. The failure prediction threshold may represent whether compression of the fluidic tubing 40 extending through the fluidic tubing pinch passage 16 exceeds a threshold tubing compression metric. The threshold tubing compression metric may represent a degree to which compression of the length of the fluidic tubing 40 increases over time. The compression metric may be expressed as a percentage increase in compression over time or as a diametrical increase in compression over time.

Figure 2:
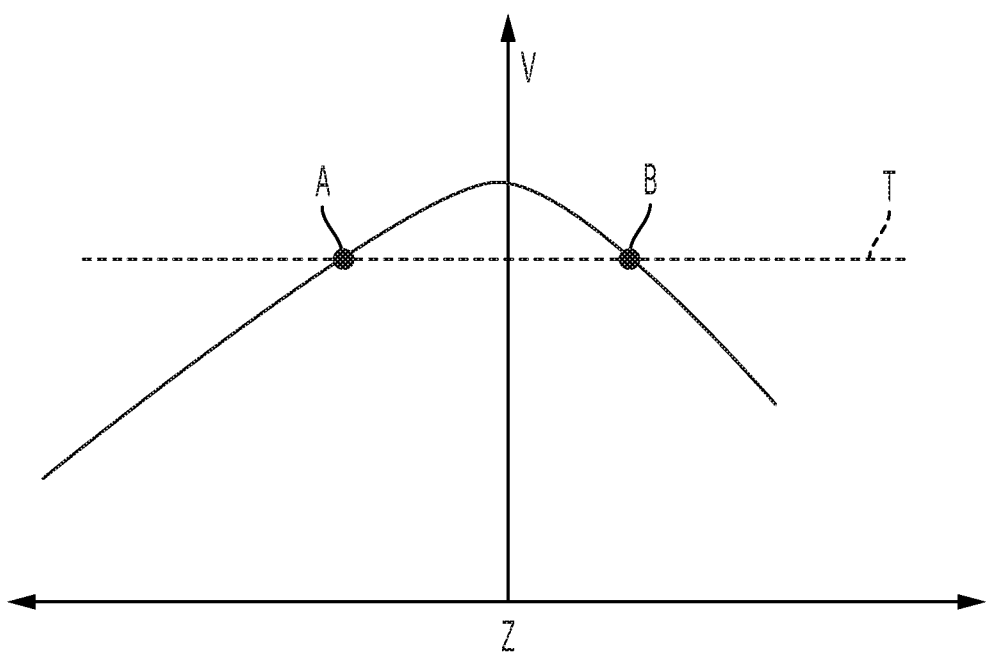
FIG. 2 is a graphical representation of the correlation between the valve plunger position and the Hall effect sensor assembly output voltage according to one embodiment of the present disclosure.

The voltage signal generated by a Hall effect corresponds directly to the relative displacement between the motive and stationary elements of the sensor. For example, referring to the configuration of FIG. 1 and the graphical representation of FIG. 2, the curve shown in FIG. 2 represents the output voltage V of the Hall effect sensing assembly 20 as the valve plunger 14 and the motive element 24 move along the Z-axis, relative to the stationary element 22, between open and closed valve states. Generally, the output voltage V increases as the motive element 24 moves closer to the stationary element 22. Values for a threshold voltage T, point A, and point B are established based on the different materials selected for pinch valve 10 and the fluidic tubing 40 to enable effective failure detection for the pinch valve 10. Generally, point A represents an open valve at the threshold voltage T and point B represents a closed valve condition. In other words, at point B, the valve plunger 14 completely seals the fluidic tubing 40. Although a single threshold voltage T is established for both points A and B in FIG. 1, it is contemplated that separate threshold voltages may alternatively be established.

In one example, if the motive element 24 of the Hall effect sensing assembly 20 consistently does not pass point A, the reading may indicate pinch valve 10 failure (e.g., the valve plunger 14 may be unable to move freely within the pinch valve 10). In another example, if the motive element 24 of the Hall effect sensing assembly 20 passes point A, but does not consistently reach point B, this may indicate that there is a leak within the fluidic tubing 40. In a third example, if the if the motive element 24 of the Hall effect sensing assembly 20 passes point A and point B, but the output signal shows a gradual decrease or drift beyond point B, this may indicate that the fluidic tubing 40 is degrading and a leak is imminent.

In a final example, if the motive element 24 of the Hall effect sensing assembly 20 reaches point B but the output signal shows a gradual increase or "drift-back" towards point A, this may indicate degradation of the valve itself. The remaining lifetime percentage % L of the pinch valve 10 may be calculated as a function of this drift by referring to the following equation:

$$\% L = \frac{|P_A - p|}{|P_A - P_B|} \times 100 \qquad \text{(Equation 1)}$$

where $P_A$ is the position of the valve plunger 14 at point A, $P_B$ is position of the valve plunger 14 at point B, and p is the real time "drift-back" position of the valve plunger 14, as determined using position-sensitive voltage signals generated by the Hall effect sensing assembly 20. Here, $P_A - P_B$ ($\Delta P$) represents the motive range of a valve plunger 14 in proper working condition.

Alternatively, the remaining lifetime percentage % L of the pinch valve 10 may be calculated as a function of the voltage output produced by the Hall effect sensing assembly 20 if the Hall effect sensing assembly is calibrated such that the motive element 24 is aligned with the stationary element 22 when the valve is in the closed state, by referring to the following equation:

$$\% L = \frac{|V_A - V_{out}|}{|V_A - V_{Max}|} \times 100 \qquad \text{(Equation 2)}$$

where $V_A$ is the voltage produced by the Hall effect sensing assembly 20 when the valve plunger 14 at point A, $V_{max}$ is the voltage produced by the Hall effect sensing assembly 20 when the motive element 24 is aligned with the stationary element 22, and $V_{Out}$ represents the real-time voltage output by the Hall effect sensing assembly 20 after the aforementioned "drift-back" of the valve plunger. Here, $V_A$-$V_B$ ($\Delta V$) represents the motive range of a valve plunger 14 in proper working condition.

Figure 3:
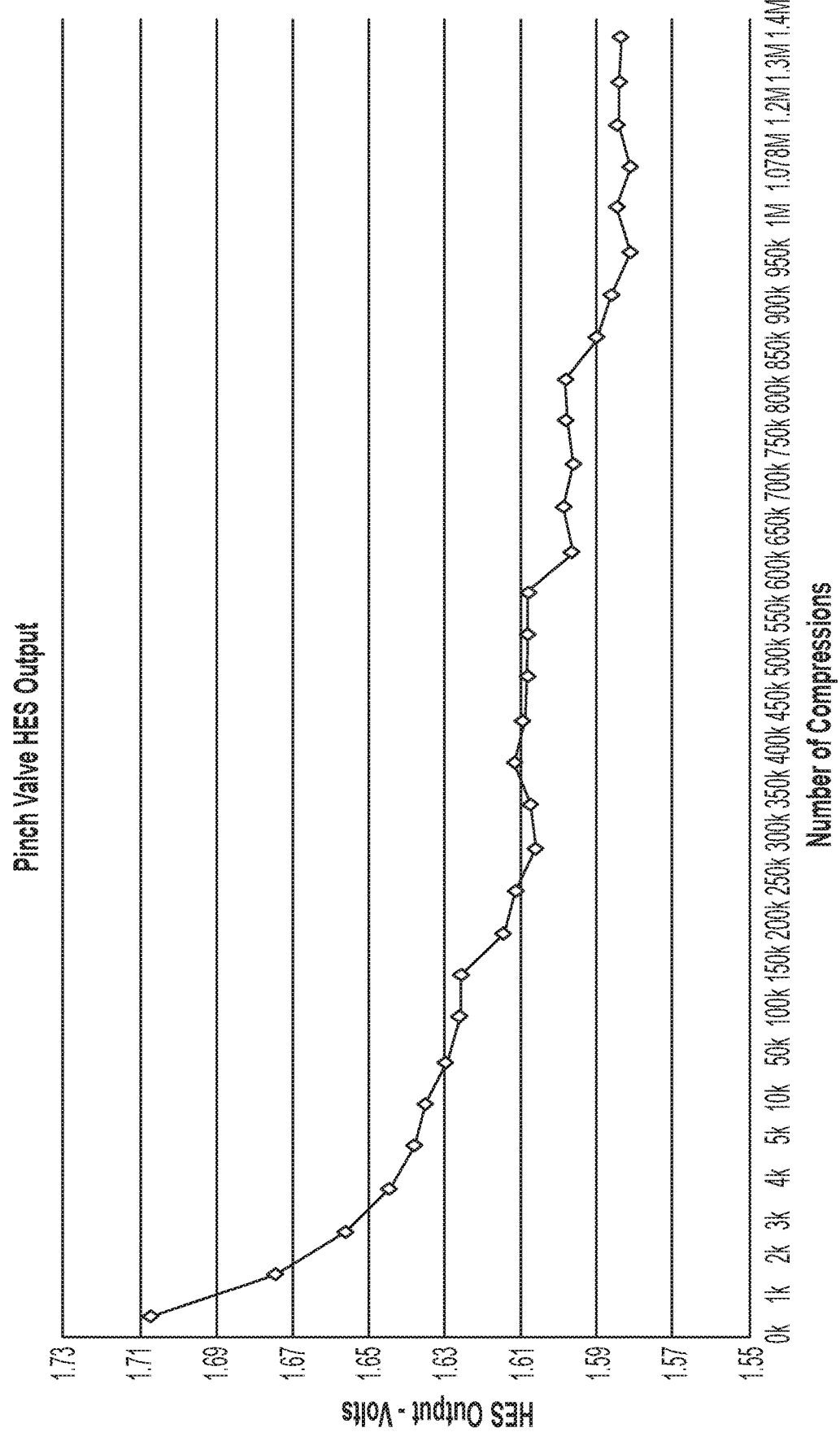
FIG. 3 is a graphical representation of the correlation between the number of compressions of valve plunger and the Hall effect sensor assembly output voltage.

FIG. 3 shows a representative voltage output produced by a pinch valve 10 comprising fluidic tubing 40, according to an embodiment. Here, the valve plunger 14 of the pinch valve 10 has compressed the fluidic tubing 40 1.4 million times. As shown in FIG. 3, the Hall effect sensor assembly 20 produces a lower voltage output as the number of compressions increases from about 1.7 volts to about 1.59 volts. The decrease in voltage output signifies that the valve plunger 14 must pinch the fluidic tubing 40 at a greater distance away from the stationary element 22 to achieve the same results as the number of compressions increases. The collected voltage data may be analyzed and used to set the failure prediction threshold, which is compared to the displacement reading derived from the output signal of the Hall effect sensor assembly 20.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the term "about" is utilized herein to represent the inherent degree of uncertainty that may be attributed to any quantitative comparison, value, measurement, or other representation. The term "about" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A pinch valve configuration comprising:
    a pinch valve comprising a valve body, a valve plunger, and a fluidic tubing pinch passage defined between a tubing seat of the valve body and an operative end of the valve plunger,
    a Hall effect sensor assembly comprising a stationary element anchored to the valve body and a motive element anchored to the valve plunger; and
    a failure prediction module in communication with the Hall effect sensor assembly, wherein
    the failure prediction module is programmed to process an output signal of the Hall effect sensor assembly as a displacement reading, to compare the displacement reading with a failure prediction threshold, and to generate a failure prediction signal from the comparison of the displacement reading with the failure prediction threshold
    the pinch valve configuration further comprises fluidic tubing extending through the fluidic tubing pinch passage of the pinch valve; and
    the failure prediction threshold represents whether compression of the fluidic tubing extending through the fluidic tubing pinch passage exceeds a threshold tubing compression metric.

2. The pinch valve configuration of claim 1, wherein the failure prediction signal comprises a digital or analog positive indicator, negative indicator, cautionary indicator, or combinations thereof.

3. The pinch valve configuration of claim 1, wherein the output signal of the Hall effect sensor assembly is an analog or digital signal.

4. The pinch valve configuration of claim 1, wherein the stationary element is a magnet and the motive element is the Hall effect sensor.

5. The pinch valve configuration of claim 1, wherein the stationary element is the Hall effect sensor and the motive element is a magnet.

6. The pinch valve configuration of claim 1, wherein the Hall effect sensor assembly produces an output signal based on the proximal relationship between the stationary element and the motive element.

7. The pinch valve configuration of claim 1, wherein:
    the displacement reading represents a degree to which the valve plunger extends into, or away from, the fluidic tubing pinch passage; and
    the displacement reading corresponds directly to the output signal of the Hall effect sensor assembly.

8. The pinch valve configuration of claim 1, wherein the failure prediction module is configured to:

determine whether a motive element of the Hall effect sensor assembly fails to retract sufficiently to an open valve state A or to advance sufficiently to a closed valve state B; and provide a pinch valve failure indication based on the determination.

9. The pinch valve configuration of claim 1, wherein the failure prediction module is configured to:

determine whether a motive element of the Hall effect sensor assembly drifts beyond a closed valve state B; and provide a tubing failure indication based on the determination.

10. The pinch valve configuration of claim 1, wherein the failure prediction module is configured to:

determine whether a motive element of the Hall effect sensor assembly reaches a closed valve state and begins to drift back towards an open valve state; and provide a remaining lifetime percentage of the pinch valve configuration based on the determination.

11. The pinch valve configuration of claim 1, wherein the failure prediction threshold represents a degree of tubing compression exceeding a threshold tubing compression metric.

12. The pinch valve configuration of claim 1, wherein the failure prediction threshold represents a degree to which tubing compression increases over time with a given length of tubing seated in the fluidic tubing pinch passage of the pinch valve.

13. The pinch valve configuration of claim 1, wherein the threshold tubing compression metric represents a degree to which compression of the length of the fluidic tubing increases over time.

14. The pinch valve configuration of claim 13, wherein the compression metric is expressed as a percentage increase in compression over time or as a diametrical increase in compression over time.

15. A pinch valve configuration comprising:

a pinch valve comprising a valve body, a valve plunger, and a fluidic tubing pinch passage defined between a tubing seat of the valve body and an operative end of the valve plunger, a Hall effect sensor assembly comprising a stationary element anchored to the valve body and a motive element anchored to the valve plunger; and a failure prediction module in communication with the Hall effect sensor assembly, wherein the failure prediction module is programmed to process an output signal of the Hall effect sensor assembly as a displacement reading, to compare the displacement reading with a failure prediction threshold, and to generate a failure prediction signal from the comparison of the displacement reading with the failure prediction threshold, the stationary element is a magnet and the motive element is the Hall effect sensor, the Hall effect sensor assembly produces an output signal based on the proximal relationship between the stationary element and the motive element, the displacement reading represents a degree to which the valve plunger extends into, or away from, the fluidic tubing pinch passage, the failure prediction threshold represents a degree of tubing compression exceeding a threshold tubing compression metric, the pinch valve configuration further comprises fluidic tubing extending through the fluidic tubing pinch passage of the pinch valve, and the failure prediction threshold represents whether compression of the fluidic tubing extending through the fluidic tubing pinch passage exceeds a threshold tubing compression metric.

* * * * *